(12) United States Patent
Peacock et al.

(10) Patent No.: US 7,748,008 B1
(45) Date of Patent: *Jun. 29, 2010

(54) RESOURCE YIELDING IN A MULTIPLE APPLICATION ENVIRONMENT

(75) Inventors: Gavin Peacock, Walnut Creek, CA (US);
Adam Hampson, Fremont, CA (US);
David Kammer, Seattle, WA (US)

(73) Assignee: PalmSource, Inc., Sunnyvale, CA (US)

( * ) Notice: Subject to any disclaimer, the term of this patent is extended or adjusted under 35 U.S.C. 154(b) by 1520 days.

This patent is subject to a terminal disclaimer.

(21) Appl. No.: 11/006,066

(22) Filed: Dec. 6, 2004

Related U.S. Application Data

(63) Continuation of application No. 09/811,990, filed on Mar. 19, 2001, now Pat. No. 6,886,163.

(51) Int. Cl.
*G06F 3/00* (2006.01)
*G06F 15/16* (2006.01)
*G06F 17/00* (2006.01)
(52) U.S. Cl. .................. 719/312; 709/229; 715/100
(58) Field of Classification Search .......... 719/310, 719/318, 312; 709/229; 715/100
See application file for complete search history.

(56) References Cited

U.S. PATENT DOCUMENTS

| 5,832,240 | A * | 11/1998 | Larsen et al. | 710/105 |
| 6,185,611 | B1 * | 2/2001 | Waldo et al. | 709/221 |
| 6,298,370 | B1 * | 10/2001 | Tang et al. | 718/102 |

* cited by examiner

*Primary Examiner*—Lechi Truong
(74) *Attorney, Agent, or Firm*—Berry & Associates P.C.

(57) ABSTRACT

A method and system for allowing a single resource (e.g., a serial port) to be shared by multiple applications in a cooperative manner. The first application to use the resource defines a yield callback that is invoked when a second application makes a request for the serial port. The callback allows the first application to decide whether or not it will yield the resource to the second application. If the first application grants the request, the second application is allowed to use the resource; otherwise, the first application continues to use the resource and the second application receives an error message. The first application can be notified when the second application is finished with the resource, so that the resource can be returned to the first application for use.

17 Claims, 7 Drawing Sheets

RESOURCE YIELDING IN A MULTIPLE APPLICATION ENVIRONMENT

RELATED APPLICATIONS

This application is a continuation of and claims priority to U.S. Ser. No. 09/811,990, now U.S. Pat. No. 6,886,163, entitled "Resource Yielding In A Multiple Application Environment," by Peacock et al., filed on Mar. 19, 2001, which is incorporated herein by reference.

BACKGROUND OF THE INVENTION

1. Field of the Invention

The present invention relates to the field of portable computer systems, such as personal digital assistants or palmtop computer systems. Specifically, the present invention relates to operating systems used by portable computer systems.

2. Related Art

A palmtop computer system, or personal digital assistant (PDA), is a computer that is small enough to be held in the hand of a user and is thus "palm-sized." By virtue of their size, palmtop computer systems are lightweight and so are exceptionally portable and convenient. As the sophistication of palmtops increase, so too does the number and types of applications that can be run on them.

Palmtops are typically equipped with a serial port and an infrared port to facilitate the transfer of information to and from external devices. Using the serial port, applications, data and other information can be exchanged between a conventional computer system and a palmtop computer using an application or process commonly referred to as "synching" or "hot synching." Typically, the palmtop is placed into a device, such as a cradle, that is communicatively coupled to the conventional computer system via a connector cable. When the palmtop is placed into the cradle, the serial port on the palmtop couples with a mechanical and electrical interface on the cradle.

The infrared communication port is used for exchanging data, applications and other information with similarly equipped devices over a wireless link. The infrared port on the palmtop is aligned with the infrared report on the other device, and information is exchanged using a process commonly referred to as "beaming."

Currently, because of size and cost considerations, the serial port and the infrared port share the same hardware within the palmtop. Specifically, a single universal asynchronous receiver-transmitter (UART) module provides the receiving and transmitting circuits required for serial communication for both the serial port and the infrared port. As a result, the infrared port and the serial port can only be used one at a time; they both cannot be used at the same time. As such, an infrared application (e.g., beaming) and an application needing the serial port (e.g., synching) cannot be used at the same time.

The preference is to have the infrared application available any time it may be needed, so that information can be beamed from one device to another quickly and seamlessly without having to make and wait for a change in operating modes. However, this is problematic because the infrared application will thereby monopolize the UART and, consequently, the serial port cannot be used. When an application attempts to open the serial port while the infrared application is open, an error message stating that the serial port is already in use will be generated.

In one prior art solution to this problem, the infrared application remains always open but in a listen-only mode unless information is being actively beamed. If beaming is not active, the infrared application relinquishes control of the UART when another application indicates that it wants to use the serial port. For example, if a synching application requests that the serial port be opened, the infrared application would yield, allowing the synching application to open and use the serial port. Thus, in the prior art, a scheme is implemented whereby the infrared application yields to an application that needs the serial port.

This solution is satisfactory in some respects, but remains problematic when there are multiple applications that need to use the serial port. For example, in addition to the synching application, palmtops now may incorporate applications supporting Bluetooth, telephony, and network (e.g., Internet) connectivity, each of which uses the serial port. When one of these applications is using the serial port, and another of these applications also needs to use the serial port, a conflict occurs and the second application receives an error message stating that the port is already in use. With the number of applications increasing, conflicts are likely to occur more frequently. However, the prior art does not provide a solution for resolving conflicts between applications competing for the serial port.

Applications supporting network connectivity introduce an additional factor that exacerbates the problem just described. After a network connection is made over the serial port, it is generally desirable to keep the network connection open in the background, so that the network can still be heard over the serial port. For example, a network library may keep the serial port open in the background. Thus, applications supporting network connectivity may monopolize the serial port for extended periods of time, in contrast to applications such as synching that typically use the serial port for only a limited amount of time. This is problematic because another application cannot use the serial port while a network library, or other such application, is open and running in the background. As described above, when another application makes a request for the serial port, it will receive an error message stating that the port is already in use.

In the prior art, when a conflict between applications occur, the user shuts down one application in order to execute the other. Such an approach to resolving conflicts is inconvenient to the user.

Accordingly, what is needed is a method and/or system that can resolve conflicts between applications seeking to use the serial port at the same time, but is convenient to the user. What is also needed is a method and/or system that can satisfy the above needs within the space constraints of a portable computer system. The present invention provides a novel solution to these needs.

SUMMARY OF THE INVENTION

The present invention provides a user-friendly method and system thereof that can resolve conflicts between applications seeking to use the serial port at the same time. In fact, the present invention provides a method and system thereof for resolving conflicts between other instances of resources that otherwise could not be used by multiple applications at the same time. The present invention accomplishes this within the space constraints of a portable computer system. The present invention provides these advantages and others not specifically mentioned above but described in the sections to follow.

The present invention pertains to a method and system that allow a single resource (e.g., memory, storage, hardware, system functions, etc.) to be shared by multiple applications in a cooperative manner. The first application to use the resource defines a yield callback that is invoked when a second application makes a request for the same resource. The callback allows the first application to decide whether or not it will yield the resource to the second application.

In one embodiment, the callback grants or denies the request from the second application by returning either a Boolean true for grant or a Boolean false for deny. If the first application denies the request, the first application continues to use the resource and the second application receives an error message. If the first application grants the request, the first application yields and the second application is allowed to use the resource.

In one embodiment, the resource is a serial port. In this embodiment, the first application to open the serial port defines a yield callback that is invoked when a second application makes a request for the serial port. The callback allows the first application to decide whether or not it will yield the port to the second application.

If the first application grants the request, the first application yields and the second application is allowed to use the port. In accordance with the present invention, the second application receives a port identifier (port ID) in a manner that is transparent to the second application, that is, as if there were no other port owner. The first application can either close the port and implement shutdown procedures, or leave the port open. In the latter case, the first application can be notified when the second application is finished with the port, and the port will be returned to the first application for use.

In accordance with the present invention, it is possible that a background port may be opened. In the present embodiment, the background port has the lowest priority among the port instances. Accordingly, a background port is open only if no foreground or yielded port is present.

In one embodiment, each application is categorized as either a "passive" application or an "active" application. In this embodiment, passive applications register themselves as such in order to define and receive the yield callback, whereas active applications are not necessarily registered as such.

In general, a passive application is an application such as a network library that remains open after a network connection has been made, in case the network library is subsequently needed. A passive application may or may not be actively performing an activity; for example, it may be operating in the background listening for a message, or it may be actively responding to a message. An active application, in general, is an application that the user has initiated, such as a synchronization application. In this embodiment, passive applications have a lower priority than active applications. A passive application can be using a resource (e.g., serial port) when an active application is not using that resource (e.g., serial port). Passive applications generally release their use of the resource when an active applications seeks to also use that resource, unless the passive application is actively performing an activity.

The present embodiment of the present invention is implemented as an automatic function in the operating systems used by portable computer systems. As an automatic function, it is user friendly. Because it is implemented in software, the present invention allows multiple applications to use a single resource (e.g., serial port) without the duplication of that resource or elements associated with that resource. Accordingly, the functionality for resolving potential conflicts between applications is added to portable computer systems without an increase in size. Moreover, there are no increases in manufacturing costs and product price attributable to additional hardware.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "registering" or "invoking" or "yielding" or "providing" or "closing" or "conducting" or "opening" or "receiving" or "sending" or "returning" or the like, refer to the action and processes of a computer system (e.g., process 500 of FIG. 5), or similar electronic computing device, that manipulates and transforms data represented as physical (electronic)

quantities within the computer system's registers and memories into other data similarly represented as physical quantities within the computer system memories or registers or other such information storage, transmission or display devices.

Exemplary Palmtop Platform

Figure 1A:
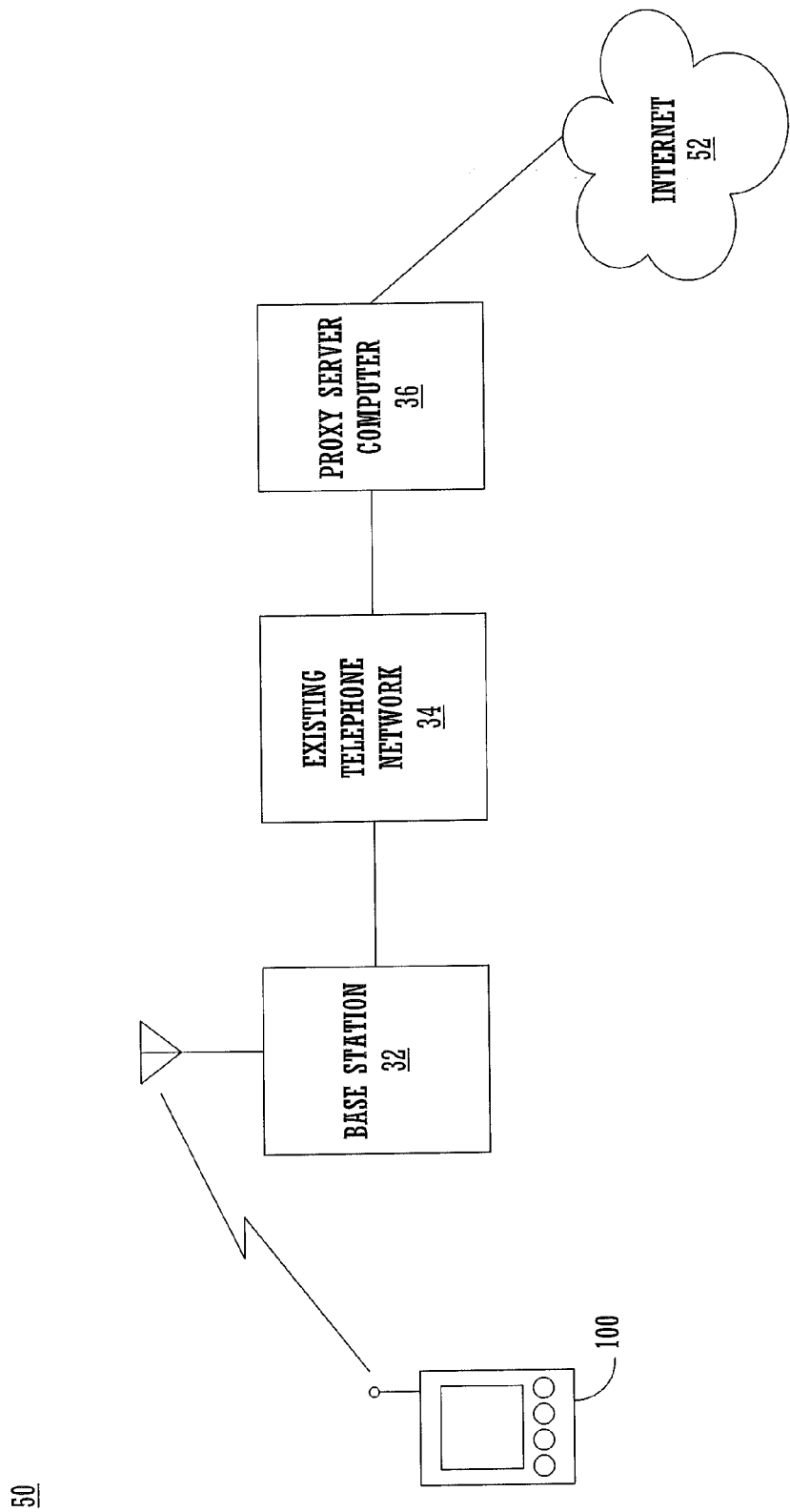
FIG. 1A is a block diagram of an exemplary network environment including a portable computer system in accordance with one embodiment of the present invention.

FIG. 1A is a block diagram of an exemplary network environment 50 including a portable computer system 100 in accordance with one embodiment of the present invention. Portable computer system 100 is also known as a palmtop or palm-sized computer system, a hand-held device, a personal digital assistant (PDA), or a personal information device (PID). In one embodiment, portable computer system 100 has the ability to transmit and receive data and information over a wireless communication interface (e.g., a radio interface). As will be seen, portable computer system 100 also has the ability to send and receive data information over a serial port and over an infrared port.

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

Figure 1B:
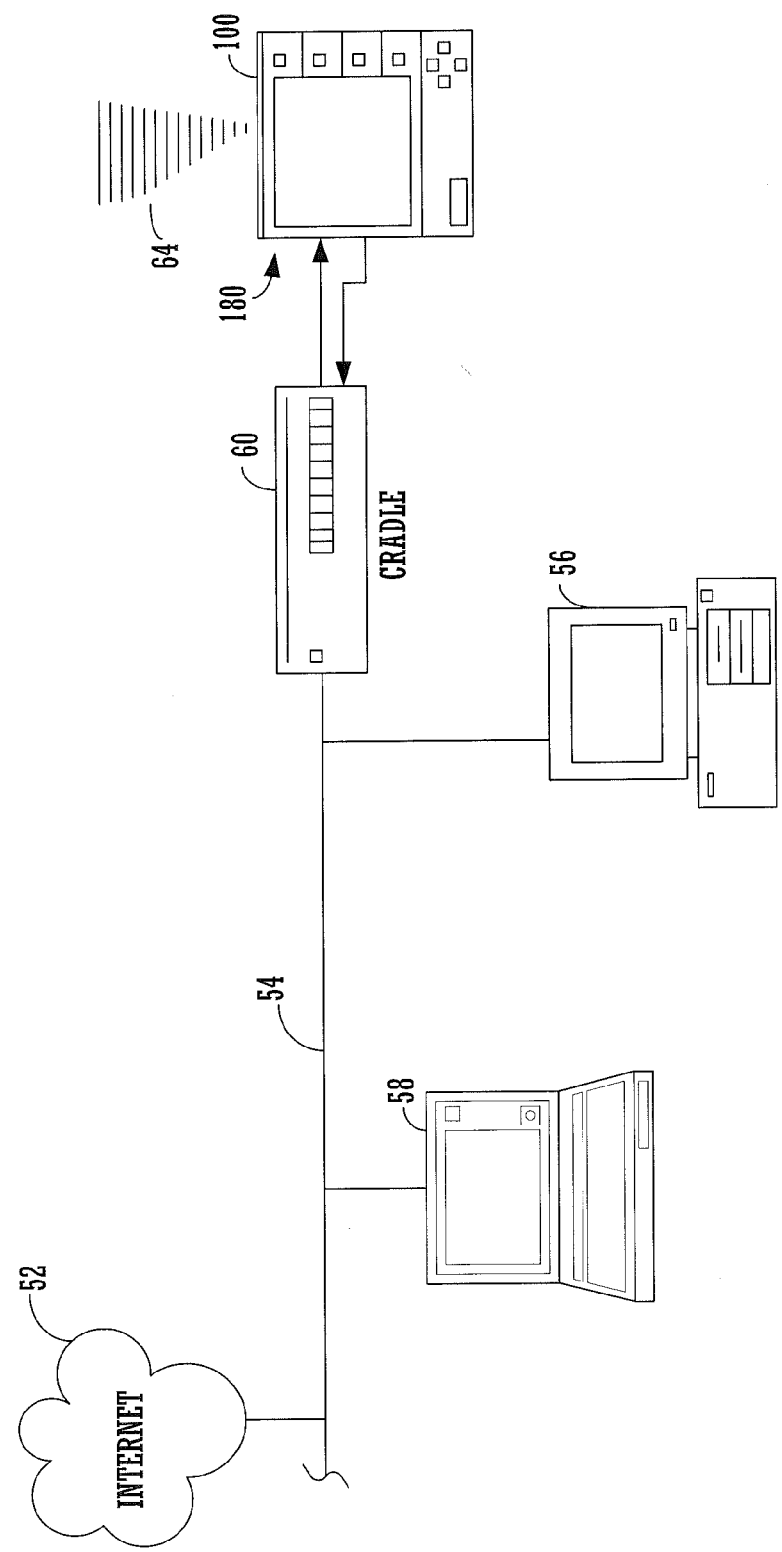
FIG. 1B is a block diagram of a portable computer system connected to other computer systems and the Internet via a cradle device in accordance with one embodiment of the present invention.

FIG. 1B illustrates another embodiment of a system 51 that can be used in conjunction with various embodiments of the present invention. System 51 comprises a desktop computer system 56 and/or a laptop system 58. Computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Bus 54 is also coupled to a cradle 60 for receiving and initiating communication with a portable computer system 100. Cradle 60 provides an electrical and mechanical communication interface between bus 54 (and anything coupled to bus 54) and the portable computer system 100 for two-way communications. For example, portable computer system 100 and/or computer systems 56 and 58 can exchange information using a synchronization process and application. The general process and results achieved through synchronization (e.g., "hot sync") are described in more detail in the following: U.S. Pat. No. 5,727,202 issued Mar. 10, 1998, by Kucala; U.S. Pat. No. 6,000,000 issued Dec. 7, 1999, by Hawkins et al.; U.S. Pat. No. 5,832,489 issued Nov. 3, 1998, by Kucala; U.S. Pat. No. 5,884,232 issued Mar. 16, 1999, by Hawkins et al.; and U.S. Pat. No. 6,006,274 issued Dec. 21, 1999, by Hawkins et al., all of which are hereby incorporated herein by reference.

In the present embodiment, cradle 60 and portable computer system 100 are coupled via a serial port 180 on portable computer system 100 (refer also to FIG. 3, below). In one embodiment, serial port 180 is an RS232 port.

It is appreciated that, in accordance with the present invention, portable computer system 100 may instead be coupled to host computer systems 56 and 58 via a wireless (e.g., radio frequency) connection, such as a wireless connection compatible with the known Bluetooth specification. In a wireless implementation such as Bluetooth, the serial port is emulated, creating a "virtual" serial port. The virtual serial port functions in a manner equivalent to a conventional serial port. Accordingly, as used herein, the term "serial port" can refer to either a conventional serial port or a virtual serial port.

Computer system 100 also contains a wireless infrared communication mechanism 64 for sending and receiving information from other devices. In one embodiment, infrared communication mechanism 64 is compliant with the IrDA (Infrared Data Association) standard and protocol.

With reference to both FIGS. 1A and 1B, it is appreciated that portable computer system 100 can be used in a network environment combining elements of networks 50 and 51.

Figure 2:
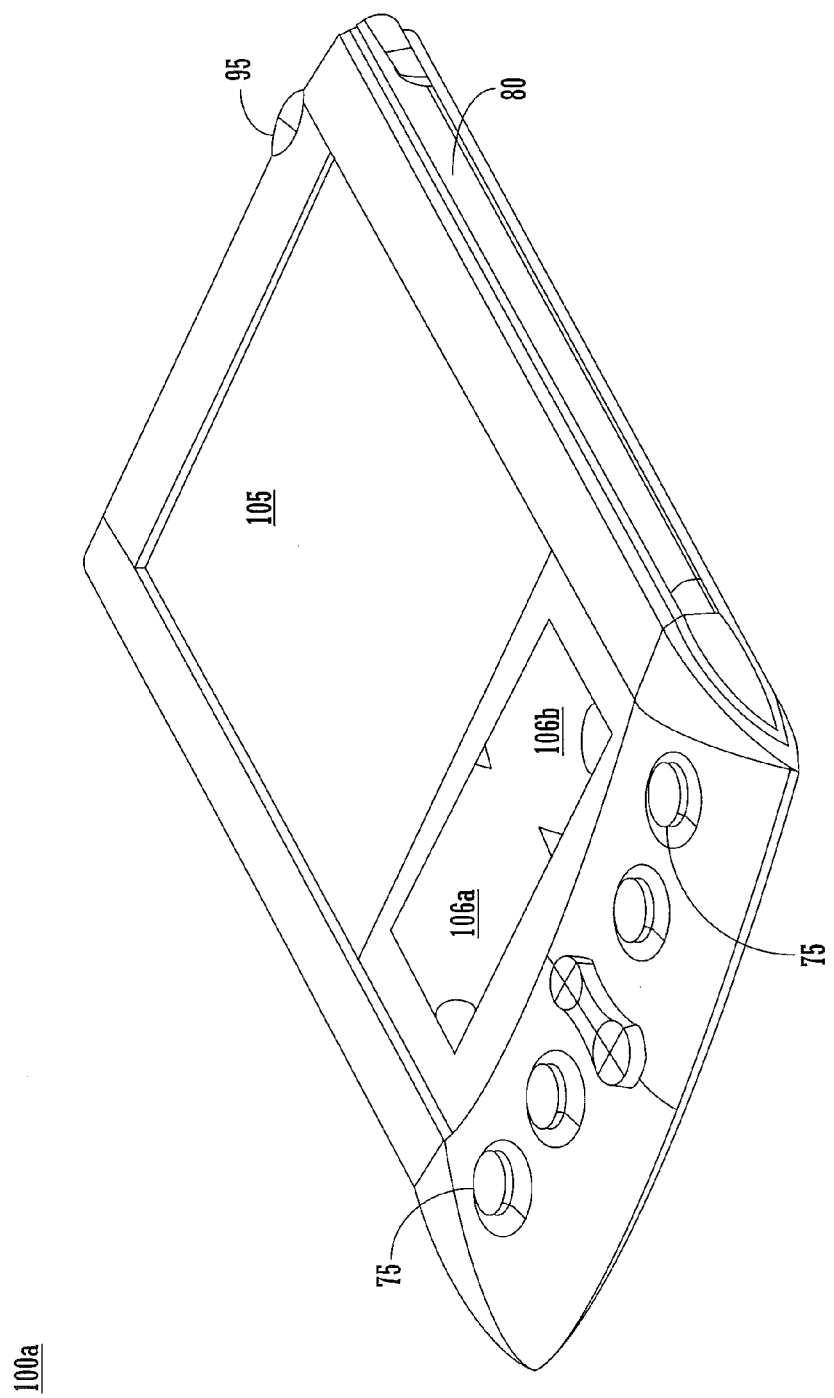
FIG. 2 is a top side perspective view of a portable computer system in accordance with one embodiment of the present invention.

FIG. 2 is a perspective illustration of the top face 100*a* of one embodiment of the portable computer system 100 of the present invention. The top face 100*a* contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100*a* also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106*a* and 106*b*. Region 106*a* is for the drawing of alphabetic characters therein (and not for numeric characters) for automatic recognition, and region 106*b* is for the drawing of numeric characters therein (and not for alphabetic characters) for automatic recognition. The stylus 80 is used for stroking a character within one of the regions 106*a* and 106*b*. The stroke information is then fed to an internal processor for automatic character recognition. Once characters are recognized, they are typically displayed on the screen 105 for verification and/or modification.

Figure 3:
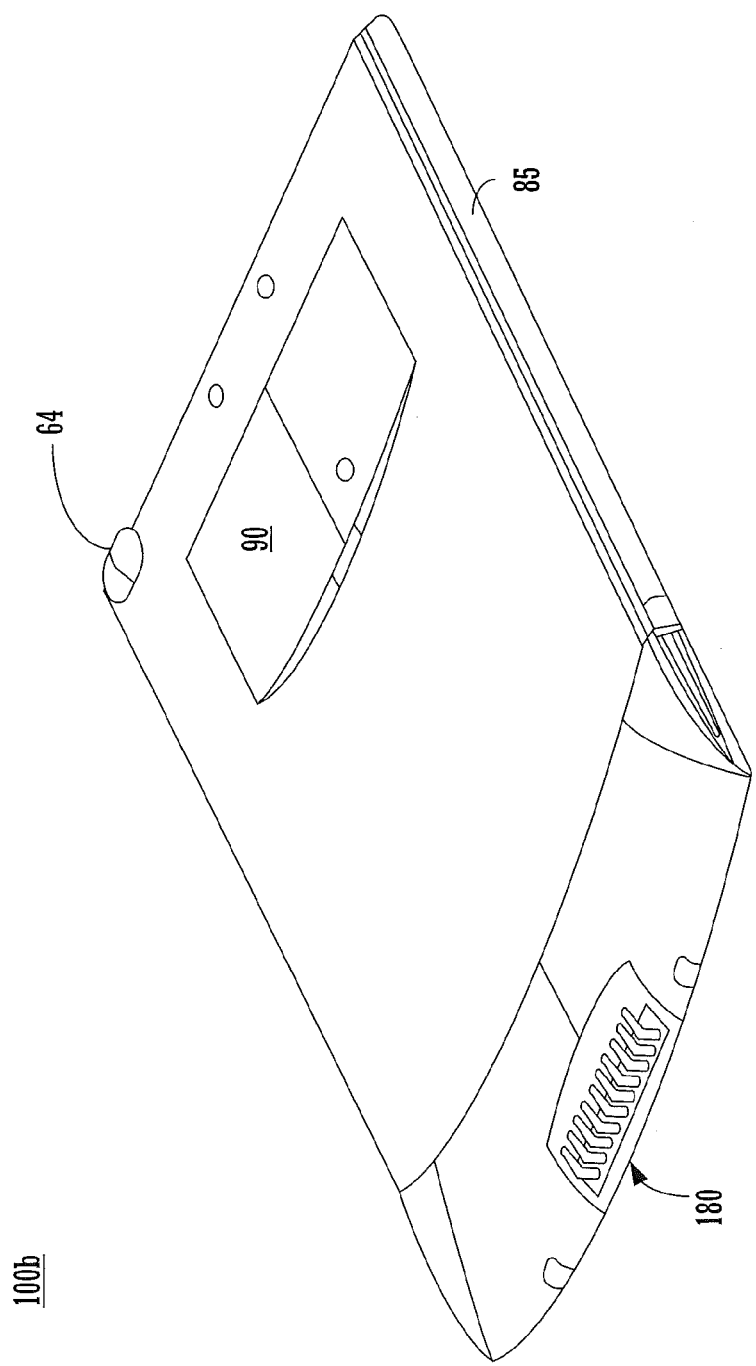
FIG. 3 is a bottom side perspective view of the portable computer system of FIG. 2.

FIG. 3 illustrates the bottom side 100*b* of one embodiment of the palmtop computer system that can be used in accordance with various embodiments of the present invention. An extendible antenna 85 is shown, and also a battery storage compartment door 90 is shown. A serial port 180 and an infrared port 64 are also shown.

Figure 4:
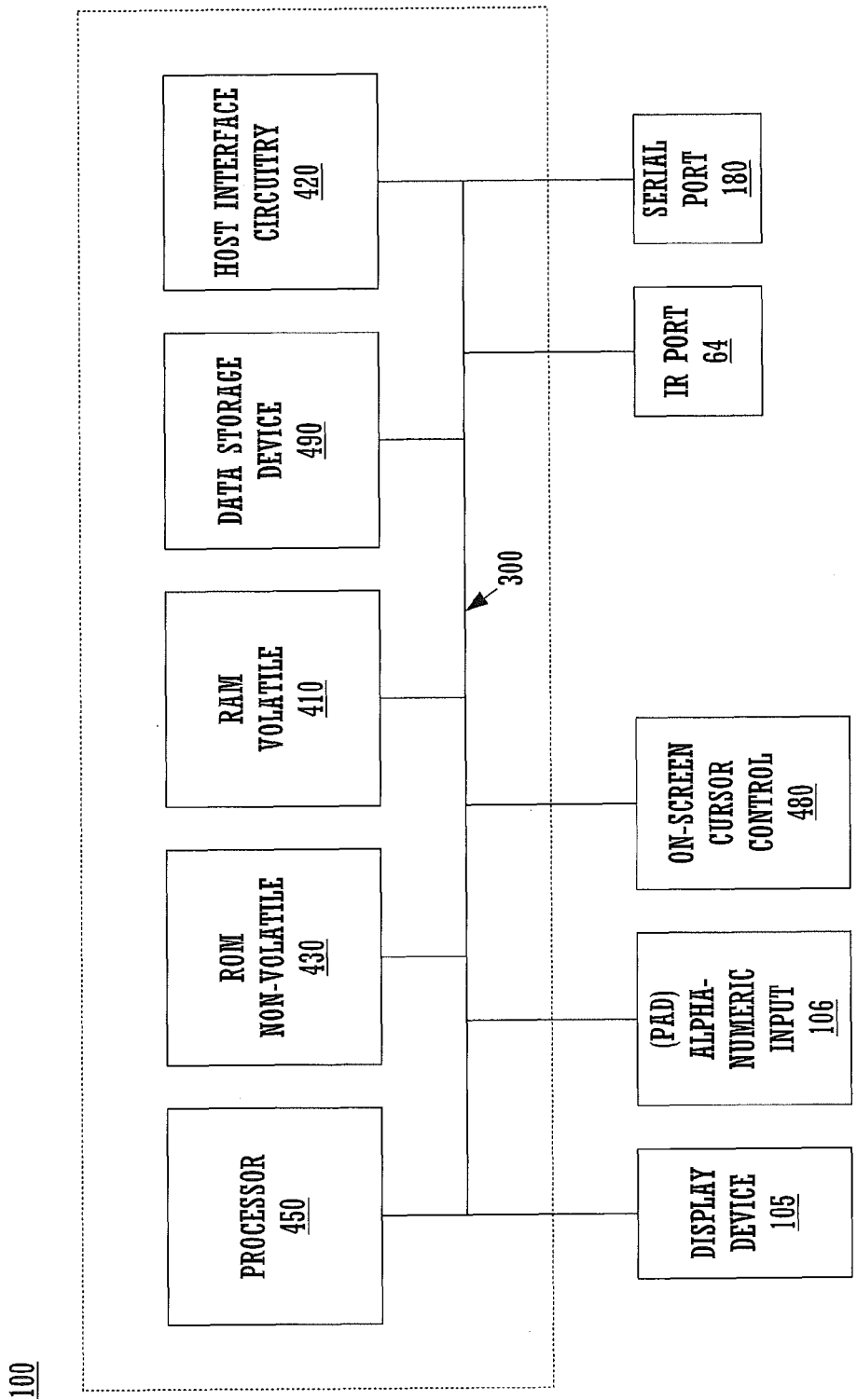
FIG. 4 is a block diagram of an exemplary portable computer system upon which embodiments of the present invention may be practiced.

FIG. 4 is a block diagram of one embodiment of a portable computer system 100 upon which embodiments of the present invention may be implemented. Portable computer system 400 is also often referred to as a PDA, a PID, a palmtop, or a hand-held computer system.

Portable computer system 400 includes an address/data bus 300 for communicating information, a central processor 450 coupled with the bus 300 for processing information and instructions, a volatile memory 410 (e.g., random access memory, RAM) coupled with the bus 300 for storing information and instructions for the central processor 450, and a non-volatile memory 430 (e.g., read only memory, ROM) coupled with the bus 300 for storing static information and instructions for the processor 450. Portable computer system 400 also includes an optional data storage device 490 (e.g., a memory stick) coupled with the bus 300 for storing information and instructions. Device 490 can be removable. Portable computer system 400 also contains a display device 105 coupled to the bus 300 for displaying information to the computer user.

In the present embodiment, portable computer system 400 of FIG. 4 includes host interface circuitry 420 coupled to bus 300. In one embodiment, host interface circuitry 420 is a universal asynchronous receiver-transmitter (UART) module that provides the receiving and transmitting circuits required for serial communication for both the serial port 180 and the infrared port 64.

Also included in computer system 400 is an optional alphanumeric input device 106 that, in one implementation, is a handwriting recognition pad ("digitizer"). Alphanumeric input device 106 can communicate information and command selections to processor 450 via bus 300. In one implementation, alphanumeric input device 106 is a touch screen device. Alphanumeric input device 460 is capable of registering a position where a stylus element (not shown) makes contact.

Portable computer system 400 also includes an optional cursor control or directing device (on-screen cursor control 480) coupled to bus 300 for communicating user input information and command selections to processor 450. In one implementation, on-screen cursor control device 480 is a touch screen device incorporated with display device 105. On-screen cursor control device 480 is capable of registering a position on display device 105 where a stylus element makes contact. The display device 105 utilized with portable computer system 400 may be a liquid crystal display (LCD) device, a cathode ray tube (CRT), a field emission display device (also called a flat panel CRT), or other display device suitable for generating graphic images and alphanumeric characters recognizable to the user. In the preferred embodiment, display device 105 is a flat panel display.

It is appreciated that portable computer system 400 can include other elements providing it with, for example, the capability for wireless communication. In one embodiment, portable computer system 400 includes a signal transmitter/receiver (transceiver) device that provides a wireless radio frequency (RF) communication link between computer system 400 and other wireless devices. In one such embodiment, the transceiver is compatible with the known Bluetooth specification. In another such embodiment, the transceiver is compatible with IEEE 802.11b. It is appreciated that other RF protocols and standards may also be used with the present invention.

In another embodiment, portable computer system 400 can include a telephony chipset or the like providing it with the functionality of a cellular phone, in particular the capability to transmit and receive cellular communications. In one embodiment, the telephony chipset is compatible with the standards for GSM and GPRS (Global System for Mobile Communications and General Packet Radio Service, respectively). It is appreciated that other telephony protocols and standards may also be used with the present invention.

Serial Port Yielding in a Multiple Application Environment

Figure 5:
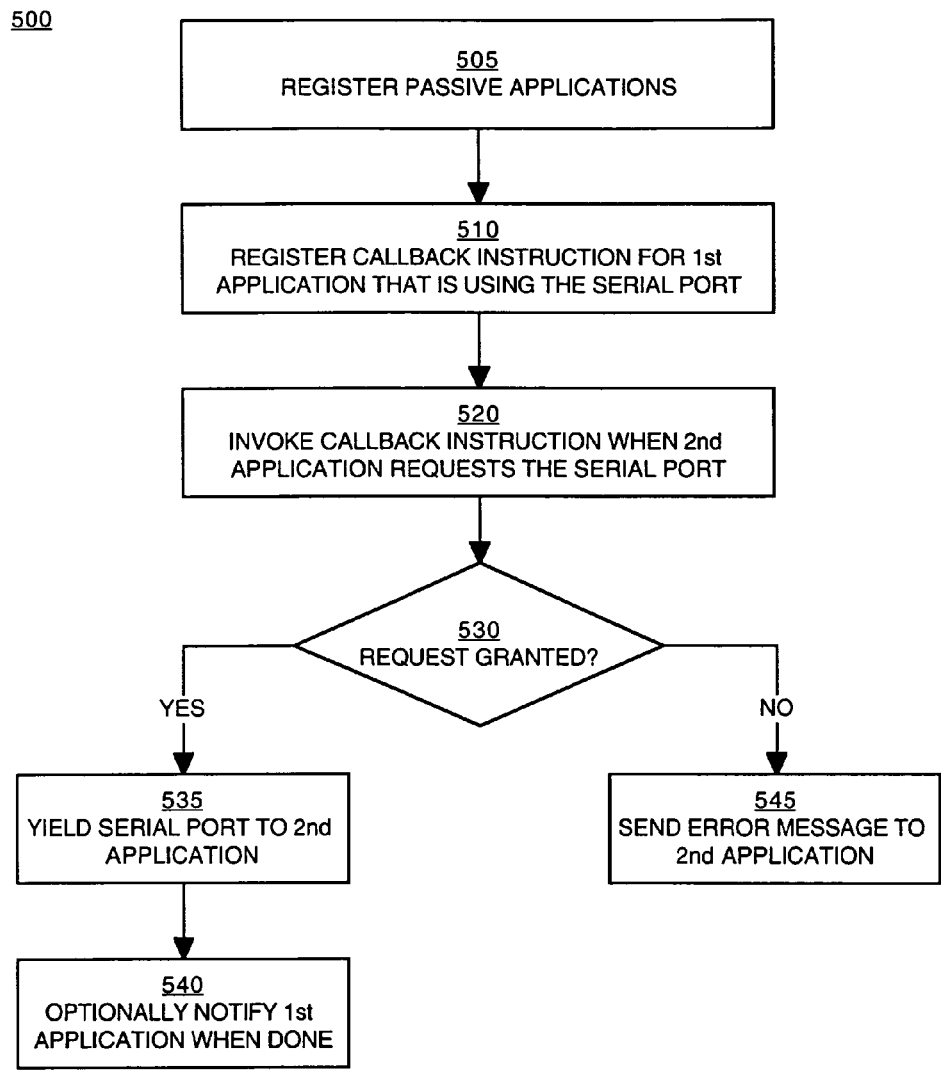
FIG. 5 is a flowchart showing the steps in a process allowing multiple applications to cooperatively share a resource in accordance with one embodiment of the present invention.

FIG. 5 is a flowchart of the steps in a process 500 for automatically allowing multiple applications to cooperatively share a resource in accordance with one embodiment of the present invention. In the present embodiment, process 500 is implemented by portable computer system 100 as computer-readable program instructions stored in a memory unit (e.g., ROM non-volatile 430, RAM volatile 410 or data storage device 490 of FIG. 4) and executed by a processor (e.g., processor 450 of FIG. 4).

For simplicity of discussion, the present invention is described for a case in which multiple applications seek to share host interface circuitry 420 coupled to serial port 180 and infrared port 64 of FIG. 4. However, it is appreciated that the present invention can also be used in other instances in which multiple applications seek to share a single resource such as, but not limited to, memory, storage, hardware, and system functions.

In one embodiment of the present invention, in step 505 of FIG. 5, each application is categorized as either a "passive" application or an "active" application. In this embodiment, passive applications register as such; however, active applications do not register themselves as such.

In general, a passive application is an application such as a network library that remains open after a network connection has been made over host interface circuitry 420 (serial port 180), in case the network library is subsequently needed. A passive application may be operating in the background, listening to a network connection or listening for a Bluetooth message, for example, but not actively performing an activity. However, at times, a passive application may be actively performing an activity, such as responding to a Bluetooth message. Thus, a passive application in effect has multiple states defined by the level of activity.

An active application, in general, is an application that the user has initiated and that is actively performing an activity, such as the exchange of information with another device according to a synchronization process. In this embodiment, active applications have a higher priority than passive applications with regard to access to host interface circuitry 420 (serial port 180). However, according to the present invention, passive applications are allowed to have host interface circuitry 420 (serial port 180) in use whenever an active application is not using the port.

In the present embodiment of the present invention, a passive application defines a yield callback instruction whereas an active application does not. The callback instruction functions as the equivalent of a "thread" or "interrupt" between the first application and the entity controlling host interface circuitry 420 (serial port 180). The callback instruction provides a pointer to the first application that is invoked when something in particular occurs. As will be seen, the callback instruction of the present invention is invoked when another application makes a request to use host interface circuitry 420 (serial port 180).

In step 510 of FIG. 5, in accordance with the present invention, the first passive application to open serial port 180 of FIG. 4 defines a callback instruction (a yield callback). In the present embodiment, the first passive application registers a callback instruction when it opens serial port 180. The callback function is registered with the entity controlling serial port 180. In one- embodiment, the callback instruction is registered with the operating system executed by processor 450 of FIG. 4. As mentioned above, in the present embodiment, an active application does not define a yield callback instruction.

In step 520 of FIG. 5, a second application makes a request to open serial port 180 of FIG. 4. The second application may be either a passive application or an active application. In the present embodiment, as a result of this request, the callback instruction registered by the first (passive) application is automatically invoked. That is, it is not necessary for the second application to invoke the callback instruction. As a result, legacy applications installed on portable computer system 100 (FIG. 4) can make a request for serial port 180 within the port-sharing scheme introduced by the present invention.

Accordingly, the first (passive) application is notified of the request for serial port 180. In one embodiment, a change field of an operating system function (specifically, the change field of SrmPortChangeType) is passed to the first application in the callback instruction, to indicate that the change is a request to yield serial port 180.

In step 530 of FIG. 5, the request to yield serial port 180 (FIG. 4) can be either granted or denied by the first (passive) application. In general, a passive application will deny the request if it is actively performing an activity, and will grant the request if it is not actively performing an activity (e.g., it is in a listening state, as described above). If the request to yield serial port 180 is granted, process 500 proceeds to step 535; otherwise, process 500 proceeds to step 545.

In one embodiment, the callback instruction grants the request to yield serial port 180 by returning a Boolean true, and denies the request by returning a Boolean false.

In step 535 of FIG. 5, the first (passive) application yields serial port 180 to the second application. In the present embodiment, the second application receives a port identifier (port ID) as if there were no other port owner. Thus, legacy applications can function seamlessly within the scheme introduced by the present invention.

It is appreciated that, when the second application opens serial port 180, it also defines a callback instruction as described by step 510 above if the second application is a passive application. Accordingly, while the second (passive) application is using serial port 180 (FIG. 4), the callback instruction for the second (passive) application may be invoked if another application (either the first application or another application) seeks to open serial port 180. Thus, multiple applications can be prompted to share serial port 180 in a cooperative manner in accordance with the present invention.

In one embodiment, the first (passive) application uses the callback instruction to close its port instance and to also conduct shutdown procedures if necessary. The first (passive) application may also leave serial port 180 open, although the port is yielded to the second application.

In step 540 of FIG. 5, in one embodiment, the callback instruction is used to notify the first (passive) application that the second application is finished with serial port 180. In one such embodiment, the change field of an operating system function (specifically, the change field of SrmPortChangeType) is passed to the first (passive) application in the callback instruction, to indicate that serial port 180 is available and/or is being returned to the first application.

In step 545 of FIG. 5, when the request to yield serial port 180 is not granted in step 530, an error message is sent to the second application indicating serial port 180 not available. In one embodiment, the second application receives a serErrAlreadyOpen error message.

In accordance with the present invention, it is possible that a background port may be opened. In the present embodiment, the background port has the lowest priority among the port instances. Accordingly, a background port is open only if no foreground or yielded port is present.

Figure 6:
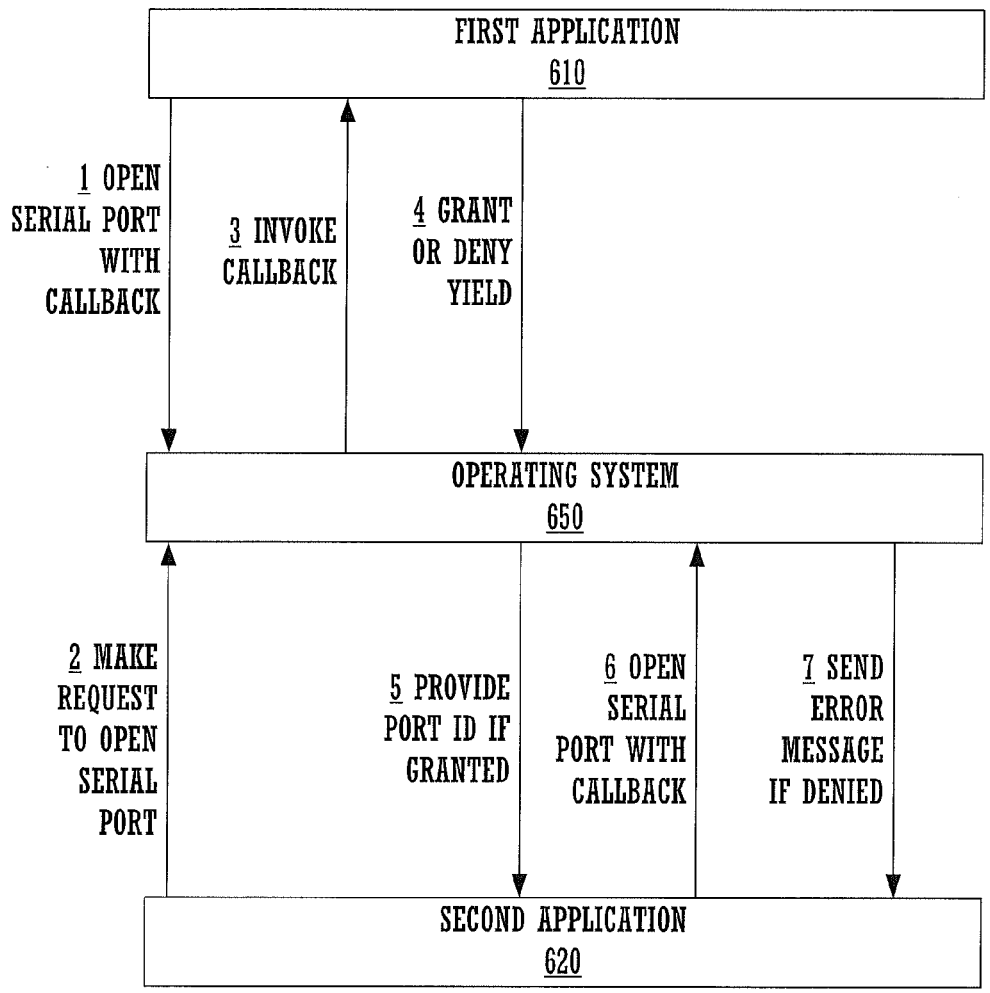
FIG. 6 is a data flow diagram illustrating the process for allowing multiple applications to cooperatively share a resource in accordance with one embodiment of the present invention.

FIG. 6 is a data flow diagram 600 illustrating process 500 (FIG. 5) for automatically allowing multiple applications to cooperatively share a resource (e.g., host interface circuitry 420 coupled to serial port 180 and infrared port 64 of FIG. 4) in accordance with one embodiment of the present invention. However, it is appreciated that the present invention can also be used in other instances in which multiple applications seek to share a single resource such as, but not limited to, memory, storage, hardware, and system functions.

In the present embodiment, first application 610, second application 620, and operating system 650 are each installed on portable computer system 100 of FIG. 4. In this embodiment, first application 610 and second application 620 are passive applications, as described above in conjunction with FIG. 5. In this embodiment, operating system 650 is the entity controlling the resource (e.g., serial port 180), and first application 610 and second application 620 register with operating system 650 as described by step 505 of FIG. 5.

With reference to FIG. 6, first application 610 opens serial port 180 of FIG. 4 and defines a callback function in accordance with the present invention (1). First application 610 is the first passive application to open serial port 180; that is, serial port 180 is not being used by another application at this time.

Continuing with reference to FIG. 6, second application 620 makes a request to open serial port 180 (2). Consequently, the callback function defined by first application 610 is invoked (3). The callback function notifies first application 610 of the request for serial port 180 made by second application 620. The callback function also indicates that the request is for first application 610 to yield serial port 180.

First application 610 returns either a grant or denial of the request to yield serial port 180 (4). If first application 610 returns a grant, then a port ID is provided to second application 620 (5), and second application 620 opens serial port 180 and defines a callback function (6). If first application 610 returns a denial, then an error message is sent to second application 620 (7).

In summary, the present invention provides a system and method that can resolve conflicts between applications seeking to use a resource at the same time. In one embodiment, the present invention is implemented as an automatic function added to the operating systems used by portable computer systems. As an automatic function, it is user friendly. Because it is implemented in software, the present invention allows multiple applications to use a single resource without the duplication of existing hardware. Accordingly, the functionality for resolving potential conflicts between applications is added to portable computer systems without an increase in size. Moreover, there are no increases in manufacturing costs and product price attributable to additional hardware.

The preferred embodiment of the present invention, resource yielding in a multiple application environment, is thus described. While the present invention has been described in particular embodiments, it should be appreciated that the present invention should not be construed as limited by such embodiments, but rather construed according to the below claims.

What is claimed is:

1. A method for using an electronic device having a processor to allow multiple applications to cooperatively access a serial port on said electronic device, said processor implementing said method comprising steps of:

a) using a processor to open said serial port for a first application, registering a callback instruction for a first application using said serial port resource;

b) receiving a request for said serial port from a second application wherein a request for said resource is to be accepted or denied;

c) invoking said callback instruction to notify said first application of a request from a second application for said serial port, wherein said step of invoking comprises steps of:

c1) sending notice to first said application of said request; and c2) receiving from said first application a response to said notice;

d) yielding said serial port to said second application provided said first application grants said request, and e) providing notice to said first application that said second application is finished using said serial port, said notice indicating said serial port is available.

2. The method as recited in claim 1 wherein said resource comprises interface circuitry coupled to multiple ports.

3. The method as recited in claim 1 further comprising a step of: registering said first application as a passive application, wherein a passive application defines said callback instruction.

4. The method as recited in claim 1 wherein said step d) further comprises steps of:

d1) closing the resource for said first application; and d2) conducting procedures for shutting down said first application.

5. The method as recited in claim 1 wherein a response granting said request is a Boolean true, and wherein a response denying said request is a Boolean false.

6. A method for using a computer having a processor to allow multiple applications to cooperatively access a serial port, said processor implementing said method comprising steps of:

a) using a processor to open opening said serial port for a first application, wherein said step of opening comprises registering a callback instruction for said first application;

b) receiving a request for said serial port from a second application;

c) invoking said callback instruction responsive to said request, wherein said step of invoking comprises steps of:

c1) sending notice to said first application of said request; and c2) receiving from said first application a response to said notice; and d) yielding said serial port to said second application provided said response from said first application grants said request and otherwise maintaining said serial port for said first application; and e) providing notice to said first application that said second application is finished using said serial port, said notice indicating said serial port is available.

7. The method as recited in claim 6 further comprising a step of:

registering said first application as a passive application.

8. The method as recited in claim 6 wherein said step d) further comprises a step of:

receiving from said first application a response denying said request.

9. The method as recited in claim 6 wherein said step d) further comprises a step of:

returning an error message to said second application when said serial port is not yielded to said second application.

10. The method as recited in claim 6 wherein said step c) further comprises steps of:

c3) closing said serial port for said first application; and c4) conducting procedures for shutting down said first application.

11. The method as recited in claim 6 wherein a response granting said request is a Boolean true, and wherein a response denying said request is a Boolean false.

12. A portable computer system comprising:

a bus;

a serial port coupled to said bus;

a processor coupled to said bus; and a memory coupled to said bus, said memory comprising instructions for implementing a method for allowing multiple applications residing on said computer system to cooperatively access said serial port, said method comprising steps of:

a) opening said serial port for a first application, wherein said step of opening comprises registering a callback instruction for said first application;

b) receiving a request for said serial port from a second application;

c) invoking said callback instruction responsive to said request, wherein said step of invoking comprises steps of:

c1) sending notice to said first application of said request; and c2) receiving from said first application a response to said notice; and d) yielding said serial port to said second application provided said response from said first application grants said request and otherwise maintaining said serial port for said first application; and e) providing notice to said first application that said second application is finished using said serial port, notice indicating said serial port is available.

13. The computer system of claim 12 wherein said method further comprises a step of:

registering said first application as a passive application.

14. The computer system of claim 12 wherein said step d) of said method further comprises a step of:

receiving from said first application a response denying said request.

15. The computer system of claim 12 wherein said step d) of said method further comprises a step of:

returning an error message to said second application when said serial port is not yielded to said second application.

16. The computer system of claim 12 wherein said step c) of said method further comprises steps of:

c3) closing said serial port for said first application; and c4) conducting procedures for shutting down said first application.

17. The computer system of claim 12 wherein a response granting said request is a Boolean true, and wherein a response denying said request is a Boolean false.

* * * * *